United States Patent
Gehring, Jr.

(10) Patent No.: US 6,627,562 B1
(45) Date of Patent: *Sep. 30, 2003

(54) BLUNT TRAUMA REDUCTION FABRIC FOR BODY ARMOR

(75) Inventor: George G. Gehring, Jr., Baldwin, NY (US)

(73) Assignee: Gehring Textiles, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/543,174

(22) Filed: Apr. 5, 2000

Related U.S. Application Data

(63) Continuation-in-part of application No. 09/406,183, filed on Sep. 24, 1999, now abandoned, which is a continuation of application No. 09/058,115, filed on Apr. 9, 1998, now Pat. No. 6,103,641.

(51) Int. Cl.[7] .............................. B32B 5/26; F41H 1/02
(52) U.S. Cl. .............................. 442/35; 442/2; 442/49; 442/50; 442/57; 428/911; 2/2.5
(58) Field of Search .............................. 442/134, 135, 442/1, 49, 2, 35, 46, 57, 50; 2/2.5; 428/911, 116; 66/196

(56) References Cited

U.S. PATENT DOCUMENTS 5,591,933 A * 1/1997 Li et al. ............ 89/36.02

* cited by examiner

*Primary Examiner*—Terrel Morris
*Assistant Examiner*—Ula C. Ruddock
(74) *Attorney, Agent, or Firm*—Gottlieb, Rackman & Reisman, P.C.

(57) ABSTRACT

A three-dimensional knit spacer fabric for use in ballistic protective garments is provided. The fabric includes a first fabric layer made from high performance, high tenacity yarns; a second fabric layer of an open mesh construction to facilitate air circulation; and a plurality of high performance monofilament yarns interconnecting the two layers.

19 Claims, 2 Drawing Sheets

BLUNT TRAUMA REDUCTION FABRIC FOR BODY ARMOR

RELATED APPLICATIONS

This is a continuation-in-part of application Ser. No. 09/406,183 filed Sep. 24, 1999, now abandon which is a continuation of application Ser. No. 09/058,115 filed Apr. 9, 1998, now U.S. Pat. No. 6,103,641.

BACKGROUND OF THE INVENTION

The present invention relates to protective body armor of the soft and hard types designed to resist penetration by bullets, buckshot, pellets, shrapnel or other projectiles.

The main objective here is to provide a fabric capable of significant reduction in the so called "blunt trauma" effect leading to injury of the armor's wearer. While the armor stops penetration of the projectile, it allows its kinetic energy to be transferred through the armor system directly to the body of the wearer as to cause injuries to the bone structure and internal organs.

This injury is described in the protective apparel industry as "blunt trauma", which is correlated to the extent of inward deformation suffered by the armor as it is impacted by a projectile.

The armor itself is made from a plurality of layers of ballistic resistant material. The maximum extent of deformation accepted under industry standards is 1.73 inches as measured in the clay material used to simulate human flesh impacted by ballistic effect on the armor.

Various devices or materials have been designed to be worn under the body armor to absorb the impact of a projectile striking it and thus reduce the inward deformation and hence the blunt trauma, which would minimize or possibly eliminate any injury to the wearer. Such devices involve the use of foam, non-wovens, plastic honeycombs and other materials. Their main drawback is the lack of air permeability, which causes the wearer to perspire excessively and leads to avoidance of the body armor protection despite the hazards involved. In many cases, law enforcement officers refuse to wear their armor because of the acute discomfort induced by its impermeable components.

SUMMARY OF THE INVENTION

A three-dimensional knit spacer fabric for use in ballistic protective garments is provided. The fabric includes a first fabric layer made from high performance, high tenacity yarns; a second fabric layer of an open mesh construction to facilitate air circulation; and a plurality of high performance monofilament yarns inter-connecting the two layers.

The main object of the present invention is to provide a high performance, cost effective blunt trauma reduction fabric system which is comfortable to wear on account of its air permeability, perspiration absorptive qualities and pleasing tactile esthetics against the wearer's body.

A further objective is to enhance, if required, the projectile stopping powers of the body armor as to reduce its thickness and weight.

Another objective is to provide cushioning and impact absorption when the wearer is involved in such hazardous situations as vehicle crashes, combat, falling debris, falls, etc., encountered in pursuit perpetrators, storming buildings or hideouts, or dealing with riots involving exposure to stoning or violent crowds.

Yet another objective is to provide a fabric system conforming to the contours of the wearer's body in a snug, comfortable fit.

Finally, it is an objective to provide fabric which may be washed, or dry cleaned, while offering long term durability.

Still other objects and advantages of the invention will in part be obvious, and in part apparent from the following description.

DETAILED DESCRIPTION OF THE PREFERRED EMBODIMENT

The fabric involved in the present invention is known in the industry as "Spacer" fabric because its components are spaced widely apart as to create a 3-dimensional structure. The fabric is made on a warp knit basis, preferably on a two needle bar specialty Raschel machine. The fabric may also be made on weft knit circular machines of the rib or interlock type.

Figure 1:
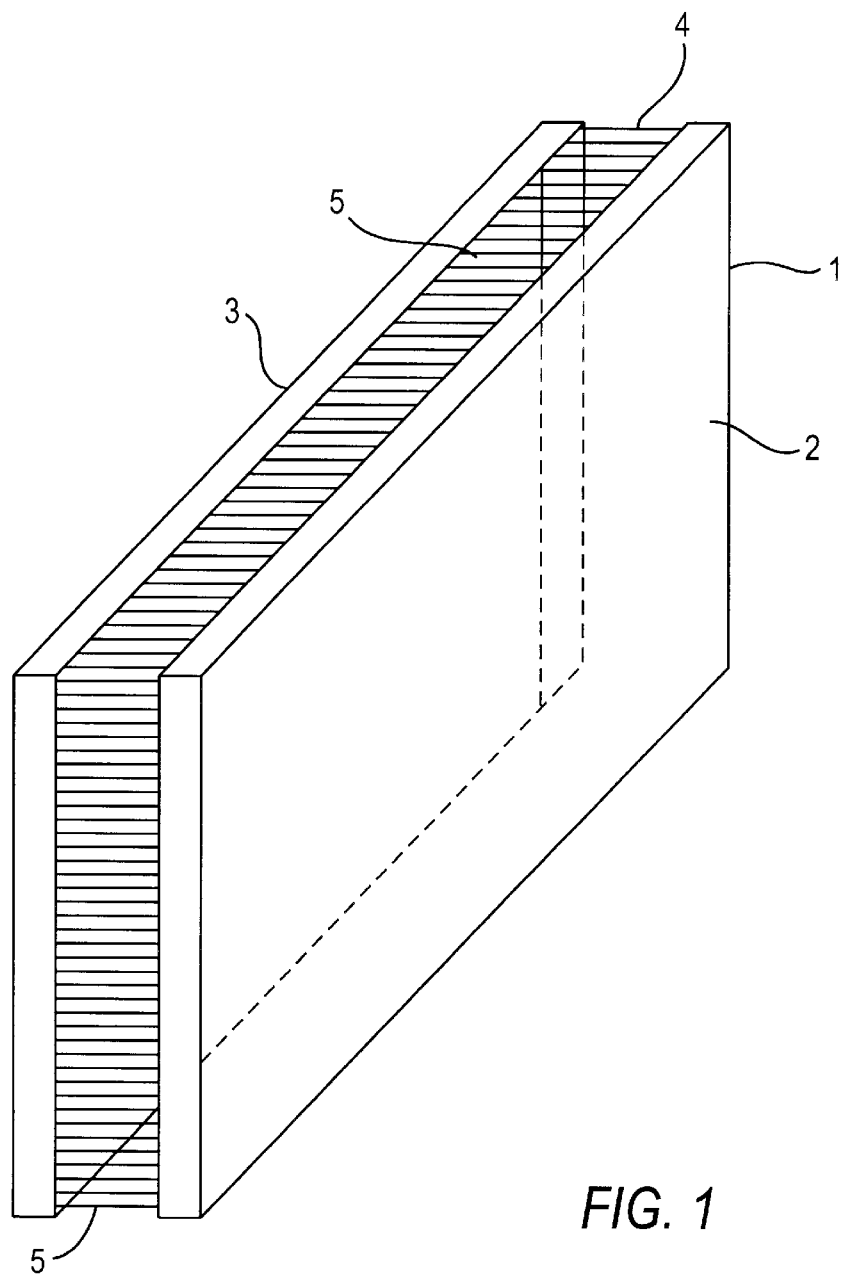
FIG. 1 is a perspective view of the spacer fabric of the invention.

The schematic structure of the Raschel type spacer is illustrated on FIG. 1. Fabric 1 comprises two component webs or layers, namely front face 2 and back face 3. Back face 3 is attached to front face 2 by a system of interconnecting yarns 5 filling the interval or distance between the faces. This distance may be set from 12 to 30 millimeters depending on product requirements as far as impact absorption is concerned. This arrangement also permits free air circulation, thus significantly enhancing the comfort factor of the system.

Yarns 5 are preferably monofilament in order to increase resilience, including those of the bi or multi-component fiber type, and have a fineness of 70–200 denier. The higher their denier, the greater the resistance to deformation under the influence of impact. The same applies to the density of the threads per square inch in the fabric. This density may be varied by suitable guide bar threading, machine gauge, knitting tightness, the number of guide bars carrying those threads and the knitting construction used to generate each of the fabric faces. The density ranges from 1,000–3,000 threads/sq. inch. The interconnecting yarns also have a substantial stiffness in the range of 30–90 based upon the industrially known Shore A scale. The interconnecting yarns are selected from high performance yarns, as described below, having a tenacity of at least 15 gram/denier.

Faces 2 and 3 are knit independently of each other by their own set of guide bars, a technique well known to those skilled in the art. This permits making each face from a different knitting construction and using different yarn types and deniers, if required. For example, back face 3, placed against the wearer's body, may be made from high tenacity, high filament count polyester yarns (70–300 denier) for softness and moisture absorption, while front face 2 is made from high performance yarns designed to resist penetration of projectiles or shrapnel. Yarns of front face 2 should also have a tenacity of at least 15 gram/denier.

Figure 2:
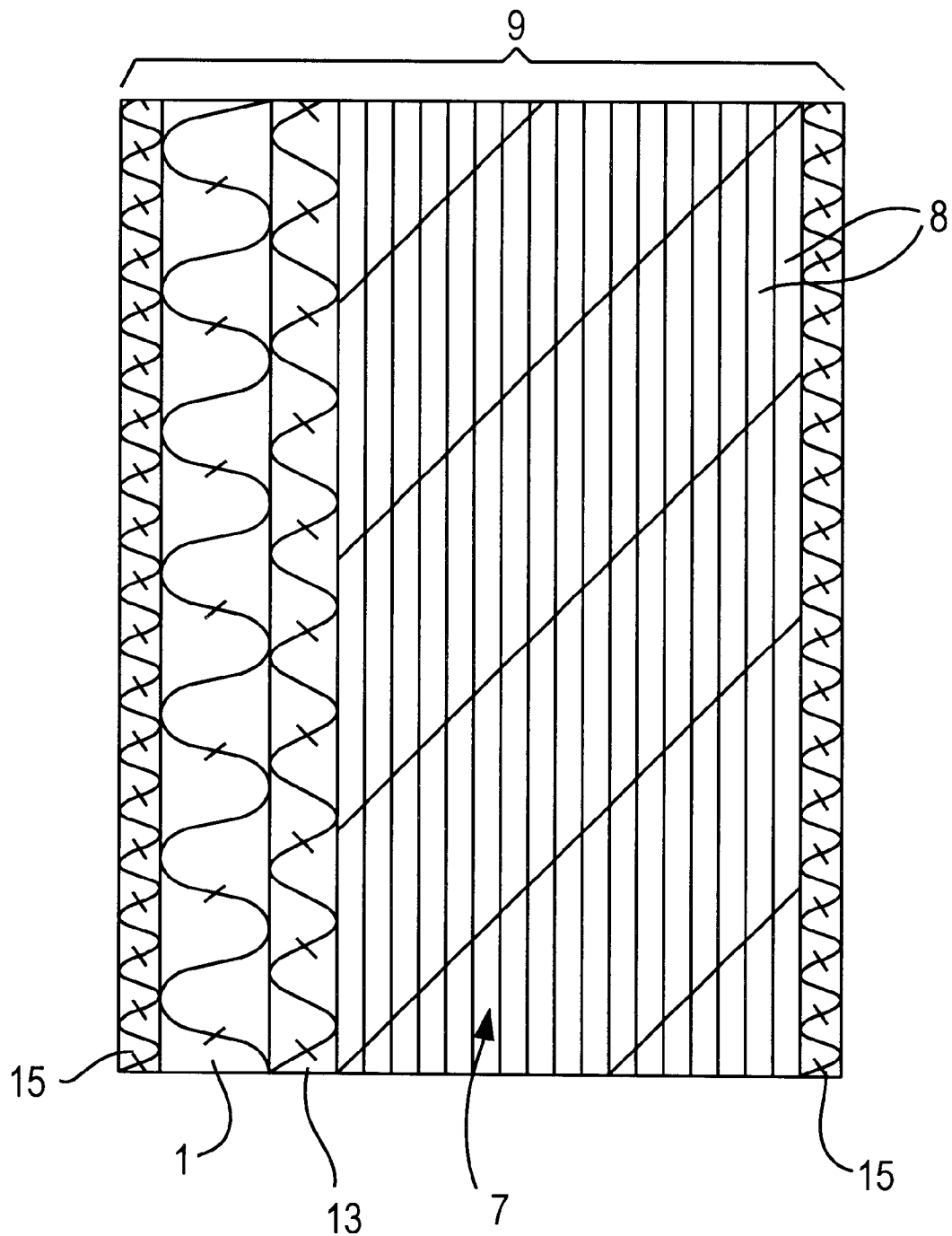
FIG. 2 is a side view in cross-section of a potion of body armor incorporating the inventive spacer fabric.

Fabric 1 of the invention may be incorporated into body armor 9 (see FIG. 2) that is used in ballistic protection garments. Armor 9 includes a plurality of textile layers or plies 8 for defining an armor portion 7. Armor portion 7 is separated from spacer fabric 1 by a fabric layer 13. Armor 9 is enclosed in a fabric wrap 15. Textile layers 8 are made from non-wovens, wovens, ceramic or plastic panels, steel plates, etc., as is well known.

Construction of back face 3 may be in an open or mesh form (porous) for optimum air circulation, while front face 2 may be of a solid and heavy construction in order to stop projectiles should they or their splinters penetrate the protective layers of the body armor itself. Specifically, front face 2 comprises a fabric layer with yarns configured into loops with or without inlays made from ground yarns and inlay yarns. The knitting method may involve inlay yarns disposed substantially straight or diagonally in the fabric layer defining front face 2. Disposal of the yarns is preferably straight for optimum structural stability.

Optionally, the yarns of back face 3 are made of polyester yarns that have been rendered hydrophilic in order to enhance transport of body fluids (i.e., capillary action), and thereby keep the skin surface dry.

Also, each of the face fabrics may be made in different weights, thickness, porosity, degree of stability and other physical characteristics to suit the purpose of providing optimum blunt trauma protection combined with enhanced splinter stopping performance.

Such spacer products provide a very effective blunt trauma reducing medium, while protecting against residual projectile or shrapnel penetration, as well as imparting the system with good wearing comfort.

In particular, when combining the inventive three-dimensional knit spacer fabric with conventional ballistic resistant material, the extent of deformation will have an improvement of at least 5–10% for general street type handgun uses.

The stitch design, fabric parameters and yarn selection must be carefully chosen in order to ensure maximum projectile, shrapnel or splinter stopping power while maintaining optimum comfort qualities. For example, if the fabric is knit too open to enhance its breathability, there will be a risk of a projectile or splinter penetrating through its stitches and interstices. Yet, if it is knit too tightly, the fabric is impermeable to air, it is hot and is uncomfortable to wear. Therefore, a right balance between all the fabric requirements must be achieved by selecting the appropriate parameters and design for the fabric. An important consideration here is the degree of risk to the wearer of the body armor in terms of the type, weight and velocity of the projectile the armor is expected to stop.

Ballistic tests have shown that suitably designed spacers can significantly reduce the number of fabric plies in the armor itself for any given projectile protection level. This lowers armor weight and cost while improving overall comfort to the wearer.

The choice of yarns depends on the type of armor used for a specific purpose, which in turn is predicated on the velocity of firearm projectiles liable to be encountered by the wearer. This has been specified by the NIJ (National Institute of Justice) Standard 010103, which divides bullets into 6 classifications depending on the velocity and weight (4 for handguns and 2 for rifles).

In order to impart the fabric with improved ballistic properties, high performance, high tenacity yarns must be used on the front or even both fabric faces, depending on the degree of hazard and type of bullets the armor wearer may encounter.

The designation "high performance" applies to yarns with a tenacity greater than 15 gram/denier, with yarn modulus of 500–2,000 gram/denier, which includes such fibers trademarked as DuPont's "Kevlar," AKZO's "Twaron," Teijin's "Technora," all in the Para-Aramid group; Allied-Signal's "Spectra" and the DSM-Toyobo's "Dyneema" in the ultra high molecular weight polyethylene group; and the Hoechst-Celanese's "Vectran," a liquid crystal polymer based fabric and Toyobo's PBO fiber known as "Zylon."

An example of fabric construction with one face in Kevlar and another of high tenacity polyester is knitted as follows:

| Bar 1 (front) | 400 den Kevlar, knit | 10-10-10-0/0-0-0-10 |
| --- | --- | --- |
| Bar 2 | 400 den Kevlar, knit | 0-2-2-2/2-0-0-0 |
| Bar 3 | 80/1 den Polyester | 0-2-2-2/2-0-2-0 |
| Bar 4 | 80/1 den Polyester | as bar 3 |
| Bar 5 | 500 den Polyester | 0-0-0-2/2-2-2-0 |
| Bar 6 | 500 den Polyester | 0-10-10-10/10-0-0-0 |

Machine gauge - 12–20 needles/inch.
Trick plate spacing 14 millimeter.

Another suitable structure is described by the following example:

| Bar 1 (front) | 650 den Spectra knit | 2-0-2-2/4-6-4-4 |
| --- | --- | --- |
| Bar 2 | 650 den Spectra | 4-2-2-2/0-2-2-2 |
| Bar 3 | 80/2 den Polyester | 2-0-6-4/8-10-4-6 |
| Bar 4 | 80/2 den Polyester | 6-4-2-0/4-6-8-10 |
| Bar 5 | 400 den Kevlar | 2-2-4-2/2-2-0-2 |
| Bar 6 | 400 den Kevlar | 4-4-2-0/2-2-4-6 |

Trick plate spacing-16 mm

Spectra is a high modulus polyethylene fiber of very high tenacity, made by the Allied-Signal Corp.

It will be noticed that the above fabric is knit with each of its faces embodying different yarn systems. Thus, one face is in 650 den Spectra, while the other in 400 den Kevlar. This structure has been selected in order to take advantage of the specific porperties of each of these fibers so that their combined effect enhances the performance of the fabric.

Of course, the above fabrics are just two examples of the many construction options based on such variables such as fiber type, denier and filament type, knitting pattern, machine gauge and trick plate spacing. Such options are well known to those skilled in knitting arts.

A weft knit spacer fabric of a similar character may be constructed on the same principle using rib or interlock machines fitted to carry out the operation of knitting, tucking and missing and a provision to set a suitable distance between the cylinder and dial. Both dial and cylinder knit independently their own fabric faces, which are joined into a spacer product with a monofilament yarn.

The spacer fabric of the invention is suitably constructed to constitute a significant improvement over other ballistic impact absorption systems such as foam, honeycomb, non-woven and other materials heretofore used as blunt trauma reduction mediums.

The advantages of the inventive spacer fabric system over others currently used in the field are:

1) Reduction in the number of plies or layers of fabric in the armor or vest, which lowers its weight and price and enhances wearing comfort.

2) Added ballistic protection, especially from bullet splinters or shrapnel. This is due to the two layers of the spacer fabric providing an extra penetration resisting barrier.

3) Permeability to air. The facility to conduct away the perspiration from the skin surface greatly contributes to wearing comfort.

4) Pleasant tactile characteristics. The face of the spacer, because of its textile nature, is more compatible with skin than foam or other plastic materials.

5) Hygienic considerations. The spacer, as a textile product, is much easier to keep clean through washing or other means than such materials as foam, honeycomb, etc.

6) Shape conformance. The knit character of the spacer makes it conform to the body contours better than other materials.

7) Long term resiliency. The "cushion" effect of the spacer does not diminish with age or use, unlike with foam or other materials.

8) Ecologically friendly. Spacer fabrics may be recycled through chemical means, unlike with foam, which cannot be recovered or degraded in landfills.

It will thus be seen that the objects set forth above, among those made apparent from the preceding description, are efficiently attained by the practice of the subject invention.

I claim:

1. A three-dimensional knit spacer fabric for use in ballistic protective garments comprising a first fabric layer made from high performance yarns of a tenacity of at least 15 gram/denier; a second fabric layer of an open mesh form to facilitate air circulation and to enhance wearing comfort by allowing freedom of movement and conforming to body contours; and a plurality of monofilament yarns interconnecting said first and second layers having a fineness of 70–200 denier, wherein said plurality of interconnecting yarns have a length extending between said layers that substantially corresponds to the distance between said layers.

2. The fabric of claim 1, wherein said layers are spaced a distance from between about 12 and 30 millimeters.

3. The fabric of claim 1, wherein interconnecting yarns have a density of between about 1,000 and 3,000 threads/sq. inch.

4. The fabric of claim 1, wherein said first fabric layer yarns comprise inlay yarns disposed substantially straight.

5. The fabric of claim 1, wherein said second fabric layer is made from polyester yarns.

6. The fabric of claim 5 wherein said polyester yarns have been rendered hydrophilic.

7. The fabric of claim 1, wherein said interconnecting yarns are made form high performance yarns of a tenacity of at least 15 gram/denier.

8. A three-dimensional knit spacer fabric for use in ballistic protective garments comprising a first fabric layer made from high performance yarns of a tenacity of at least 15 gram/denier, said high performance yarns being knit to impart said first fabric layer with ballistic properties selected to resist penetration by high velocity projectiles; a second fabric layer of an open mesh form to facilitate air circulation and to enhance wearing comfort by allowing freedom of movement and conforming to body contours; and a plurality of yarns interconnecting said first and second layers, wherein said plurality of interconnecting yarns have a length extending between said layers that substantially corresponds to the distance between said layers.

9. The fabric of claim 8 where said high performance yarns have a yarn modulus of 500–2,000 grams/denier.

10. The fabric of claim 8 where said yarns interconnecting said layers have a fineness of 70–200 denier.

11. A three dimensional knit spacer fabric comprising: a first fabric layer, a second fabric layer; and a plurality of interconnecting yarns arranged and constructed to maintain said first and second fabric layers at a predetermined distance from each other; at least one of said first and second fabric layers being knit from high performance yarn in an arrangement selected to intercept and provide protection from high velocity firearm projectiles.

12. The three dimensional fabric of claim 11 wherein said high performance yarns have a tenacity of at least 15 grams/denier.

13. The three dimensional fabric of claim 11 wherein said high performance yarns have a yarn modulus of 500–2000 grams/denier.

14. The three dimensional fabric of claim 11 wherein said first layer is adapted to intercept high velocity projectiles and said second layer is formed from yarns knit to allow high air circulation.

15. The three dimensional fabric of claim 11 wherein said first and said second layers are knit from yarns arranged in a pattern selected to intercept high velocity projectiles from fire arms.

16. The three dimensional fabric of claim 11 wherein said layers are spaced a distance from between about 12 and 30 millimeters.

17. The three dimensional fabric of claim 11 wherein interconnecting yarns have a density of between about 1,000 and 3,000 threads/sq. inch.

18. The three dimensional fabric of claim 11 wherein said first fabric layer yarns comprise inlay yarns disposed substantially straight.

19. The three dimensional fabric of claim 11 wherein said second fabric layer is made from polyester yarns.

\* \* \* \* \*